United States Patent [19]

Morman

[11] Patent Number: 5,226,992
[45] Date of Patent: Jul. 13, 1993

[54] PROCESS FOR FORMING A COMPOSITE ELASTIC NECKED-BONDED MATERIAL

[75] Inventor: Michael T. Morman, Alpharetta, Ga.

[73] Assignee: Kimberly-Clark Corporation, Neenah, Wis.

[21] Appl. No.: 452,154

[22] Filed: Dec. 15, 1989

Related U.S. Application Data

[62] Division of Ser. No. 248,518, Sep. 23, 1988, abandoned.

[51] Int. Cl.$^5$ ............................................. B32B 27/14
[52] U.S. Cl. .................................. 156/62.4; 156/62.8; 156/181; 156/229
[58] Field of Search ............... 428/152, 198, 903, 349, 428/354, 355, 252, 253, 296, 283, 326, 913; 156/62.4, 62.8, 181, 229, 296

[56] References Cited

U.S. PATENT DOCUMENTS

| | | | |
|---|---|---|---|
| 1,741,530 | 12/1929 | Mayer . | |
| 2,004,110 | 6/1935 | Head | 154/40 |
| 2,574,200 | 11/1951 | Teague | 23/74 |
| 3,047,444 | 7/1962 | Harwood | 154/46 |
| 3,341,394 | 9/1967 | Kinney | 161/72 |
| 3,410,748 | 11/1968 | Blue | 161/76 |
| 3,485,695 | 12/1969 | Ness | 156/229 |
| 3,932,682 | 1/1976 | Loft et al. | 428/296 |
| 4,013,816 | 3/1977 | Sabee et al. | 428/288 |
| 4,209,563 | 6/1980 | Sisson | 428/288 |
| 4,342,812 | 8/1982 | Selwood | 428/286 |
| 4,443,513 | 4/1984 | Meitner et al. | 422/195 |
| 4,486,485 | 12/1984 | Sookne | 428/198 |
| 4,489,543 | 12/1984 | Bromley et al. | 57/208 |
| 4,515,854 | 5/1985 | Kogame et al. | 428/288 |
| 4,551,378 | 11/1985 | Carey, Jr. | 428/198 |
| 4,554,121 | 11/1985 | Kramers | 264/103 |
| 4,606,964 | 8/1986 | Wideman | 428/152 |
| 4,652,487 | 3/1987 | Morman | 428/138 |
| 4,657,802 | 4/1987 | Morman | 428/152 |
| 4,668,566 | 5/1987 | Braun | 428/286 |
| 4,677,695 | 7/1987 | Van Gompel et al. | 2/79 |
| 4,692,368 | 9/1987 | Taylor et al. | 428/137 |
| 4,720,415 | 1/1988 | Vander Wielen et al. | 428/152 |
| 4,789,699 | 12/1988 | Kieffer et al. | 524/271 |
| 4,981,747 | 1/1991 | Morman | 428/284 |

FOREIGN PATENT DOCUMENTS

| | | |
|---|---|---|
| 0019295 | 11/1980 | European Pat. Off. . |
| 0030418 | 6/1981 | European Pat. Off. . |
| 0127483 | 12/1984 | European Pat. Off. . |
| 0180703 | 5/1986 | European Pat. Off. . |
| 0237642 | 9/1987 | European Pat. Off. . |
| 239080 | 9/1987 | European Pat. Off. . |
| 2632875 | 11/1977 | Fed. Rep. of Germany . |
| 2757526 | 6/1979 | Fed. Rep. of Germany . |
| 3734963 | 4/1988 | Fed. Rep. of Germany . |
| 648644 | 1/1951 | United Kingdom . |
| 1576436 | 10/1980 | United Kingdom . |

*Primary Examiner*—Jenna L. Davis
*Attorney, Agent, or Firm*—Karl V. Sidor

[57] ABSTRACT

The present invention provides a composite elastic necked-bonded material including at least one necked material joined to at least one elastic sheet. The composite elastic necked-bonded material is stretchable in a direction generally parallel to the direction of constriction or necking of the necked material. Also disclosed is a method of producing a composite elastic necked-bonded material by necking a neckable material and then joining the necked material to an elastic sheet.

19 Claims, 5 Drawing Sheets

A > B

PROCESS FOR FORMING A COMPOSITE ELASTIC NECKED-BONDED MATERIAL

This is a divisional application of application Ser. No. 07/248,518, filed on Sep. 23, 1988 is now abandoned.

FIELD OF THE INVENTION

The present invention relates to elasticized materials and a method of making the same. Generally speaking, the present invention relates to a composite elastic material including at least one elastic sheet.

BACKGROUND OF THE INVENTION

Plastic nonwoven webs formed by nonwoven extrusion processes such as, for example, meltblowing processes and spunbonding processes may be manufactured into products and components of products so inexpensively that the products could be viewed as disposable after only one or a few uses. Representatives of such products include diapers, tissues, wipes, garments, mattress pads and feminine care products.

Some of the problems in this area are the provision of an elastic material which is resilient and flexible while still having a pleasing feel. One problem is the provision of an elastic material which does not feel plastic or rubbery. The properties of the elastic materials can be improved by forming a laminate of an elastic material with one or more nonelastic material on the outer surface which provide better tactile properties.

Nonwoven webs formed from nonelastic polymers such as, for example, polypropylene are generally considered nonelastic. The lack of elasticity usually restricts these nonwoven web materials to applications where elasticity is not required or desirable. Composite materials of elastic and nonelastic material have been made by bonding the nonelastic material to the elastic material in a manner that allows the entire composite material to stretch or elongate so they can be used in garment materials, pads, diapers and feminine care products.

In one such composite material, a nonelastic material is joined to an elastic material while the elastic material is in a stretched condition so that when the elastic material is relaxed, the nonelastic material gathers between the locations where it is bonded to the elastic material. The resulting composite elastic material is stretchable to the extent that the nonelastic material gathered between the bond locations allows the elastic material to elongate. An example of this type of composite material is disclosed, for example, by U.S. Pat. No. 4,720,415 to Vander Wielen et al., issued Jan. 19, 1988.

DEFINITIONS

The term "elastic" is used herein to mean any material which, upon application of a biasing force, is stretchable, that is, elongatable, to a stretched, biased length which is at least about 160 percent of its relaxed unbiased length, and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be stretched by much more than 60 percent of their relaxed length, for example, 100 percent or more, and many of these will recover to substantially their original relaxed length, for example, to within 105 percent of their original relaxed length, upon release of the stretching force.

As used herein, the term "nonelastic" refers to any material which does not fall within the definition of "elastic," above.

As used herein, the term "recover" refers to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length−final sample length)/(maximum stretch length−initial sample length)] × 100.

As used herein, the term "nonwoven web" means a web that has a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "microfibers" means small diameter fibers having an average diameter not greater than about 100 microns, for example, having a diameter of from about 0.5 microns to about 50 microns, more particularly, microfibers may have an average diameter of from about 4 microns to about 40 microns.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduce as by, for example, eductive drawing or other well-known spunbonding mechanisms. The production of spunbonded nonwoven webs is illustrated in patents such as, for example, in U.S. Pat. No. 4,340,563 to Appel et al., and U.S. Pat. No. 3,692,618 to Dorschner et al. The disclosures of both these patents are hereby incorporated by reference.

As used herein, the term "interfiber bonding" means bonding produced by entanglement between individual fibers to form a coherent web structure without the use of thermal bonding. This fiber entangling is inherent in the meltblown processes but may be generated or increased by processes such as, for example, hydraulic entangling or needlepunching. Alternatively and/or additionally, a bonding agent can be utilized to increase the desired bonding and to maintain structural coherency of a fibrous web. For example, powdered bonding agents and chemical solvent bonding may be used.

As used herein, the term "sheet" means a layer which may either be a film or a nonwoven web.

As used herein, the term "necked material" refers to any material which has been narrowed in at least one dimension by application of a tensioning force.

As used herein, the term "neckable material" means any material which can be necked.

As used herein, the term "percent neckdown" refers to the ratio determined by measuring the difference between the un-necked dimension and the necked dimension of the neckable material and then dividing that difference by the un-necked dimension of the neckable material.

As used herein, the term "composite elastic necked-bonded material" refers to a material having an elastic sheet joined to a necked material at least at two places. The elastic sheet may be joined to the necked material at intermittent points or may be completely bonded thereto. The joining is accomplished while the elastic sheet and the necked material are in juxtaposed configuration. The composite elastic necked-bonded material is elastic in a direction generally parallel to the direction of neckdown of the necked material and may be stretched in that direction to the breaking point of the necked material. A composite elastic necked-bonded material may include more than two layers. For example, the elastic sheet may have necked material joined to both of its sides so that a three-layer composite elastic necked-bonded material is formed having a structure of necked material/elastic sheet/necked material. Additional elastic sheets and/or necked material layers may be added. Yet other combinations of elastic sheets and necked materials may be used.

As used herein, the term "palindromic laminate" means a multilayer laminate, for example, a composite elastic necked-bonded material which is substantially symmetrical. Exemplary palindromic laminates would have layer configurations of A/B/A, A/B/B/A, A/A/B/B/A/A, etc. Exemplary non-palindromic laminates would have layer configurations of A/B/C, A/B/C/A, A/C/B/D, etc.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

SUMMARY OF THE INVENTION

In accordance with the present invention there is provided a method of producing a composite elastic necked-bonded material including one or more layers of necked material joined to one or more layers of elastic sheet, the method comprising:

applying a tensioning force to at least one neckable material to neck the material; and joining the tensioned, necked material to at least one elastic sheet at least at two locations.

The elastic sheet and the reversibly necked material may be joined by overlaying the materials and applying heat and/or pressure to the overlaid materials. Alternatively, the layers may by joined by using other bonding methods and materials such as, for example, adhesives, pressure sensitive adhesives, ultrasonic welding, high energy electron beams, and/or lasers. In one aspect of the present invention, the elastic sheet may be formed directly on the necked material utilizing processes, such as, for example, meltblowing processes and film extrusion processes.

The necked material used as a component of the composite elastic necked-bonded material is formed from a neckable material. If the material is stretchable, it may be necked by stretching in a direction generally perpendicular to the desired direction of neck-down. The neckable material may be any material that can be necked and joined to an elastic sheet. Such neckable materials include knitted and loosely woven fabrics, bonded carded webs, spunbonded webs or meltblown webs. The meltblown web may include meltblown microfibers. The neckable material may also have multiple layers such as, for example, multiple spunbonded layers and/or multiple meltblown layers. The neckable material may be made of polymers such as, for example, polyolefins. Exemplary polyolefins include polypropylene, polyethylene, ethylene copolymers and propylene copolymers.

The elastic sheet may be a pressure sensitive elastomer adhesive sheet. If the elastic sheet is nonwoven web of elastic fibers or pressure sensitive elastomer adhesive fibers, the fibers may be meltblown fibers. More particularly, the meltblown fibers may be meltblown microfibers.

Other aspects of this invention provide that the pressure sensitive elastomer adhesive sheet and necked material may be joined without the application of heat such as, for example, by a pressure bonder arrangement or by tensioned wind-up techniques.

DETAILED DESCRIPTION OF THE INVENTION

Figure 1:
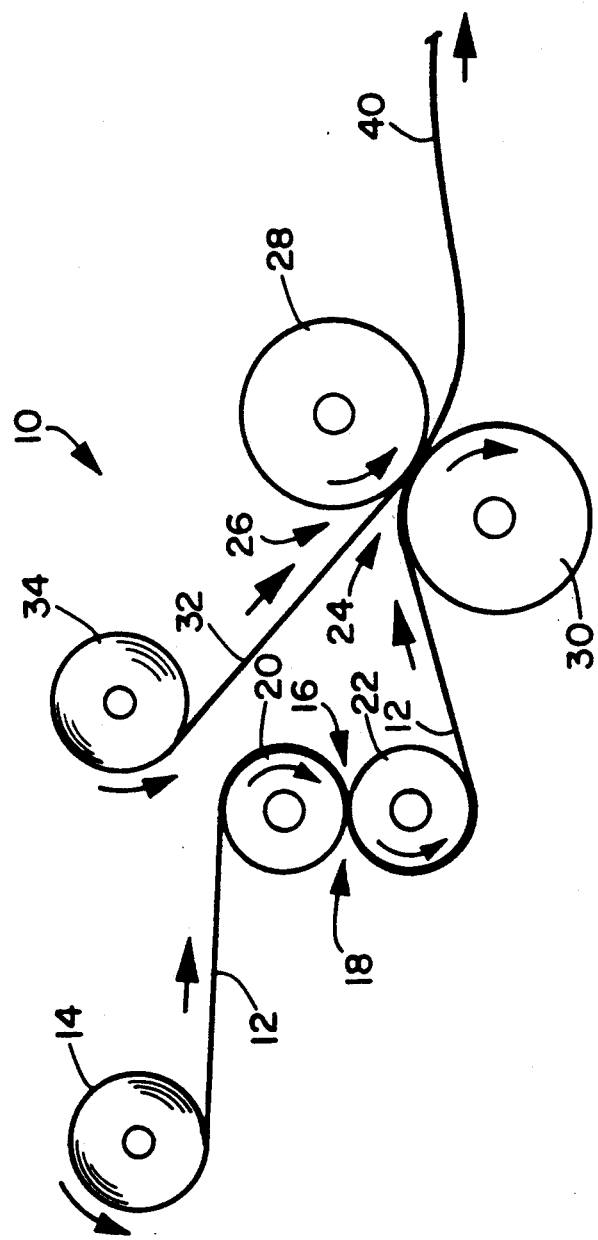
FIG. 1 is a schematic representation of an exemplary process for forming a composite elastic necked-bonded material.

Referring to FIG. 1 of the drawings there is schematically illustrated at 10 a process for forming a composite elastic necked-bonded material.

According to the present invention, a neckable material 12 is unwound from a supply roll 14 and travels in the direction indicated by the arrow associated therewith as the supply roll 14 rotates in the direction of the arrows associated therewith. The neckable material 12 passes through a nip 16 of the drive roller arrangement 18 formed by the drive rollers 20 and 22.

The neckable material 12 may be formed by known nonwoven extrusion processes, such as, for example, known meltblowing processes or known spunbonding processes, and passed directly through the nip 16 without first being stored on a supply roll.

An elastic sheet 32 is unwound from a supply roll 34 and travels in the direction indicated by the arrow associated therewith as the supply roll 34 rotates in the direction of the arrows associated therewith. The elastic sheet passes through the nip 24 of the bonder roller arrangement 26 formed by the bonder rollers 28 and 30. The elastic sheet 32 may be formed by extrusion processes such as, for example, meltblowing processes or film extrusion processes and passed directly through the nip 24 without first being stored on a supply roll.

The neckable material 12 passes through the nip 16 of the S-roll arrangement 18 in a reverse-S path as indicated by the rotation direction arrows associated with the stack rollers 20 and 22. From the S-roll arrangement 18, the neckable material 12 passes through the pressure nip 24 formed by a bonder roller arrangement 26. Because the peripheral linear speed of the rollers of the S-roll arrangement 18 is controlled to be less than the peripheral linear speed of the rollers of the bonder roller arrangement 26, the neckable material 12 is tensioned between the S-roll arrangement 18 and the pressure nip of the bonder roll arrangement 26. By adjusting the difference in the speeds of the rollers, the neckable material 12 is tensioned so that it necks a desired amount and is maintained in such tensioned, necked condition while the elastic sheet 32 is joined to the necked material 12 during their passage through the bonder roller arrangement 26 to form a composite elastic necked-bonded laminate 40.

Other methods of tensioning the neckable material 12 may be used such as, for example, tenter frames or other cross-machine direction stretcher arrangements that expand the neckable material 12 in other directions such as, for example, the cross-machine direction so that, after bonding to the elastic sheet 32, the resulting composite elastic necked-bonded material 40 will be elastic in a direction generally parallel to the direction of necking, i.e., in the machine direction.

The neckable material 12 may be a nonwoven material such as, for example, spunbonded web, meltblown web or bonded carded web. If the neckable material is a web of meltblown fibers, it may include meltblown microfibers. The neckable material 12 may be made of fiber forming polymers such as, for example, polyolefins. Exemplary polyolefins include one or more of polypropylene, polyethylene, ethylene copolymers, propylene copolymers, and butene copolymers. Useful polypropylenes include, for example, polypropylene available from the Himont Corporation under the trade designation PC-973, polypropylene available from the Exxon Chemical Company under the trade designation Exxon 3445, and polypropylene available from the Shell Chemical Company under the trade designation DX 5A09.

In one embodiment of the present invention, the neckable material 12 is a multilayer material having, for example, at least one layer of spunbonded web joined to at least one layer of meltblown web, bonded carded web or other suitable material. For example, neckable material 12 may be a multilayer material having a first layer of spunbonded polypropylene having a basis weight from about 0.2 to about 8 ounces per square yard (osy), a layer of meltblown polypropylene having a basis weight from about 0.2 to about 4 osy, and a second layer of spunbonded polypropylene having a basis weight of about 0.2 to about 8 osy. Alternatively, the neckable material 12 may be single layer of material such as, for example, a spunbonded web having a basis weight of from about 0.2 to about 10 osy or a meltblown web having a basis weight of from about 0.2 to about 8 osy.

The neckable material 12 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbant materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

If the neckable material 12 is a nonwoven web of fibers, the fibers should be joined by interfiber bonding to form a coherent web structure which is able to withstand necking. Interfiber bonding may be produced by entanglement between individual meltblown fibers. The fiber entangling is inherent in the meltblown process but may be generated or increased by processes such as, for example, hydraulic entangling or needlepunching. Alternatively and/or additionally a bonding agent may be used to increase the desired bonding.

The elastic sheet 32 may be made from any material which may be manufactured in sheet form. Generally, any suitable elastomeric fiber forming resins or blends containing the same may be utilized for the nonwoven webs of elastomeric fibers of the invention and any suitable elastomeric film forming resins or blends containing the same may be utilized for the elastomeric films of the invention.

For example, the elastic sheet 12 may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The elastic sheet 32 may be formed from, for example, (polystyrene/poly(ethylene-butylene)/polystyrene) block copolymers available from the Shell Chemical Company under the trademark KRATON G. One such block copolymer may be, for example, KRATON G-1657.

Other exemplary elastomeric materials which may be used to form elastic sheet 32 include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastic sheets from polyester elastic materials is disclosed in, for example, U.S. Pat. No. 4,741,949 to Morman et al., hereby incorporated by reference.

A polyolefin may also be blended with the elastomeric polymer to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothaene NA601 (also referred to herein as PE NA601 or polyethylene NA601). Two or more of the polyolefins may be utilized. Extrudable blends of elastomeric polymers and polyolefins are disclosed in, for example., U.S. Pat. No. 4,663,220 to Wisneski et al., hereby incorporated by reference.

The elastic sheet 32 may also be a pressure sensitive elastomer adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, necked nonelastic web. In regard to the tackifying resins and tackified extrudable elastomeric compositions, note the resins and compositions as described in U.S. Pat. No. 4,789,699 filed Oct. 15, 1986 of J. S. Keiffer and T. J. Wisneski for "Ambient Temperature Bondable Elastomeric Nonwoven Web", the disclosure of which is hereby incorporated by reference.

Any tackifier resin can be used which is compatible with the elastomeric polymer and can withstand the high processing (e.g., extrusion) temperatures. If blending materials such as, for example, polyolefins or extending oils are used, the tackifier resin should also be compatible with those blending materials. Generally, hydrogenated hydrocarbon resins are preferred tackifying resins, because of their better temperature stability. REGALREZ TM and ARKON TM P series tackifiers are examples of hydrogenated hydrocarbon resins. ZONATAK TM 501 lite is an example of a terpene hydrocarbon. REGALREZ hydrocarbon resins are available from Hercules Incorporated. ARKON P series resins are available from Arakawa Chemical (U.S.A.) Incorporated. Of course, the present invention is not limited to use of such three tackifying resins., and other tackifying resins which are compatible with the other components of the composition and can withstand the high processing temperatures, can also be used.

A pressure sensitive elastomer adhesive may include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON G-1657, about 17 to about 23 percent Polyethylene NA-601, and about 15 to about 20 percent REGALREZ 1126.

The elastic sheet 32 may also be a multilayer material in that it may include two or more individual coherent webs or films. Additionally, the elastic sheet 12 may be a multilayer material in which one or more of the layers contain a mixture of elastic and nonelastic fibers or particulates. An example of the latter type of elastic web, reference is made to U.S. Pat. No. 4,209,563, incorporated herein by reference, in which elastomeric and non-elastomeric fibers are commingled to form a single coherent web of randomly dispersed fibers. Another example of such a composite web would be one made by a technique such as disclosed in U.S. Pat. No. 4,100,324 issued Jul. 11, 1978 to Richard A. Anderson et al., and also incorporated herein by reference. That patent discloses a nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, hydrocolloid (hydrogel) particulates commonly referred to as super-absorbents occurs prior to collection of the fibers upon a collecting device to form a coherent web of randomly dispersed fibers.

The bonder roller arrangement 26 may be a smooth calender roller 28 and a smooth anvil roller 30 or may include a patterned calender roller, such as, for example, a pin embossing roller arranged with a smooth anvil roller. One or both of the calender roller and the smooth anvil roller may be heated and the pressure between these two rollers may be adjusted by well-known means to provide the desired temperature, if any, and bonding pressure to join the necked material 12 to the elastic sheet 32 forming a composite elastic necked-bonded material 40.

The necked material and the elastic sheet may be completely bonded together and still provide a composite elastic necked-bonded material with good stretch properties. That is, a composite elastic material may be formed by joining a necked material to an elastic sheet utilizing bonding surfaces such as, for example, smooth rollers or platens to provide a high bond surface area. A composite elastic necked-bonded material 40 may also be formed utilizing a bonding pattern such as, for example, the sinusoidal bonding pattern shown in FIG. 6. That pattern has approximately 75 pins per square inch with each pin about 0.059 inches in diameter, providing a bond surface area of about 20.5 percent.

Necked materials may be joined to the elastic sheet 32 at least at two places by any suitable means such as, for example, thermal bonding or ultrasonic welding which softens at least portions of at least one of the materials, usually the elastic sheet because the elastomeric materials used for forming the elastic sheet 32 have a lower softening point than the components of the necked material 12. Joining may be produced by applying heat and/or pressure to the overlaid elastic sheet 32 and the necked material 12 by heating these portions (or the overlaid layer) to at least the softening temperature of the material with the lowest softening temperature to form a reasonably strong and permanent bond between the re-solidified softened portions of the elastic sheet 32 and the necked material 12.

Elastic sheets can be used having basis weights less than 0.5 osy (ounces per square yard), for example, from about 0.25 to about 0.4 osy. Such extremely low basis weight sheets are useful for economic reasons, particularly for use in disposable products. Additionally, elastic sheets having higher basis weights such as, for example, from about 0.5 to about 10 osy may also be used.

With regard to thermal bonding, one skilled in the art will appreciate that the temperature to which the materials, or at least the bond sites thereof, are heated for heat-bonding will depend not only on the temperature of the heated roll(s) or other heat sources but on the residence time of the materials on the heated surfaces, the basis weights of the materials and their specific heats and thermal conductivities. However, for a given combination of materials, and in view of the herein contained disclosure the processing conditions necessary to achieve satisfactory bonding can be readily determined by one of skill in the art.

Conventional drive means and other conventional devices which may be utilized in conjunction with the apparatus of FIG. 1 are well known and, for purposes of clarity, have not been illustrated in the schematic view of FIG. 1.

The relation between the original dimensions of the neckable material 12 to its dimensions after tensioning determines the approximate limits of stretch of composite elastic necked-bonded material. Because the neckable material 12 is able to stretch and return to its necked dimensions in directions such as, for example the machine direction or the cross-machine direction, the composite elastic necked-bonded material will be stretchable in generally the same direction as the neckable material 12.

Figure 2:
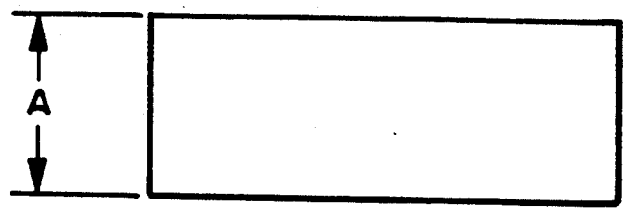
FIG. 2 is a plan view of an exemplary neckable material before tensioning and necking.
Figure 2A:
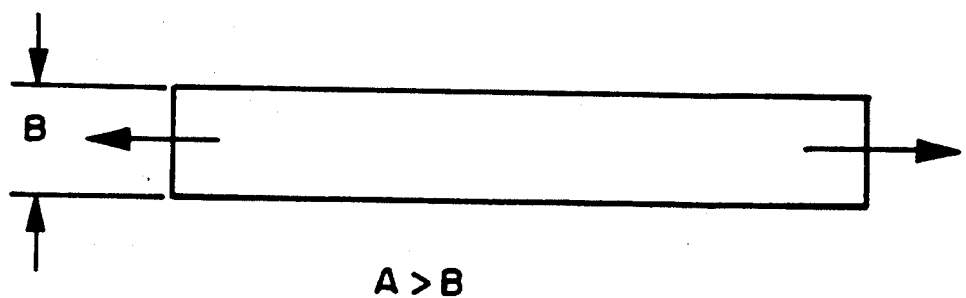
FIG. 2A is a plan view of an exemplary necked material.
Figure 2B:
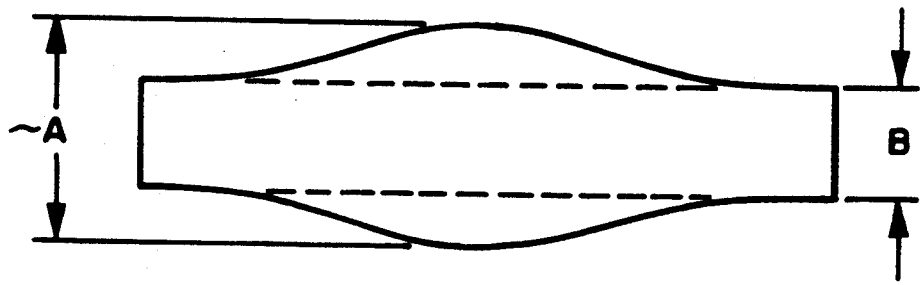
FIG. 2B is a plan view of an exemplary composite elastic necked-bonded material while partially stretched.

For example, with reference to FIGS. 2, 2A, and 2B, if it is desired to prepare a composite elastic necked-bonded material stretchable to a 150% elongation, a width of neckable material shown schematically and not necessarily to scale in FIG. 2 having a width "A" such as, for example, 250 cm, is tensioned so that it necks down to a width "B" of about 100 cm. The necked material shown in FIG. 2A is then joined to an elastic sheet (not shown) having a width of approximately 100 cm and which is at least stretchable to a width of 250 cm. The resulting composite elastic necked-bonded material shown schematically and not necessarily to scale in FIG. 2B has a width "B" of about 100 cm and is stretchable to at least the original 250 cm width "A" of the neckable material for an elongation of about 150%. As can be seen from the example, the elastic limit of the elastic sheet needs only to be as great as the minimum desired elastic limit of the composite elastic necked-bonded material.

Figure 3:
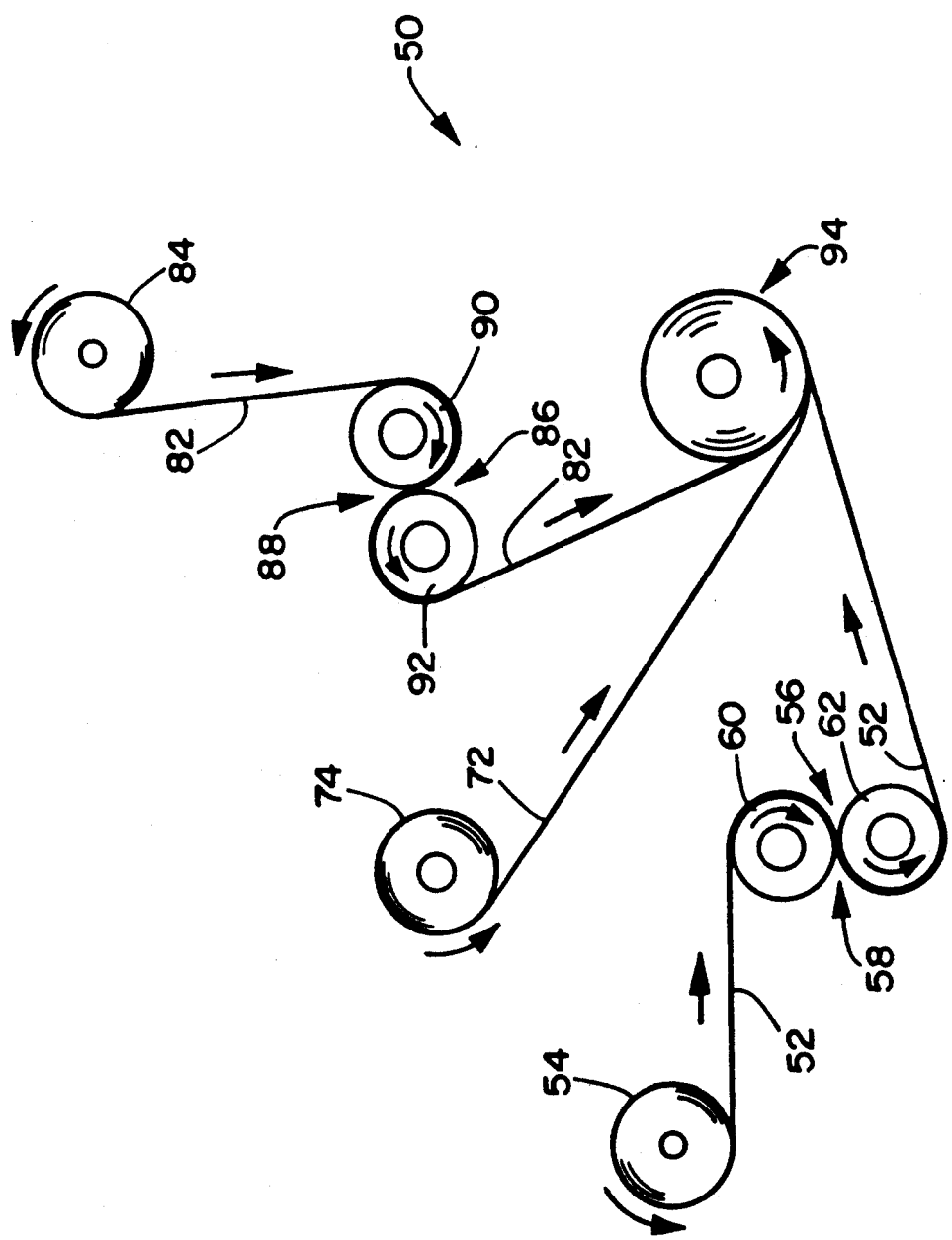
FIG. 3 is a schematic representation of an exemplary process for forming a composite elastic necked-bonded material using a tensioned wind-up method.

Referring now to FIG. 3 of the drawings, there is schematically illustrated at 50 an exemplary process for forming a composite elastic necked-bonded material by a tensioned wind-up method. A first neckable material 52 is unwound from a supply roll 54 and a second neckable material 82 is unwound from a supply roll 84. The neckable materials 52 and 82 then travel in the direction indicated by the arrows associated therewith as the supply rolls 54 and 84 rotate in the direction of the arrows associated therewith. The neckable material 52 then passes through the nip 56 of an S-roll arrangement 58 formed by the stack rollers 60 and 62. Likewise, the neckable material 82 passes through the nip 86 of an S-roll arrangement 88 formed by the stack rollers 90 and 92. The neckable materials 52 and 82 may be formed by known nonwoven extrusion processes such as, for example, known spunbonding or known meltblowing processes and passed through the nips 56 and 86 without first being stored on supply rolls.

An elastic sheet 72 is unwound from a supply roll 74 and travels in the direction indicated by the arrow associated therewith as supply roll 74 rotates in the direction of the arrows associated therewith. The elastic sheet 72 may be formed by known extrusion processes such as, for example, known meltblowing processes or known film extrusion processes without first being stored on a supply roll.

The neckable material 52 then passes through a nip 56 of an S-roll arrangement 58 in a reverse-S wrap path as indicated by the rotation direction of the arrows associated with the stack rollers 60 and 62. Likewise, the neckable material 82 passes through a nip 86 of an S-roll arrangement 88 in a reverse-S wrap path as indicated by the rotation direction arrows associated with the stack rollers 90 and 92. Because the peripheral linear speeds of the rollers of the S-roll arrangements 58 and 88 are controlled to be lower than the peripheral linear speed of the rollers of the wind-up roll 94, the neckable materials 52 and 82 are necked and tensioned so that they sandwich the elastic sheet 72 as they are wound up on the wind-up roll 94.

A two layer composite in which one side of the elastic sheet is protected to prevent bonding (e.g., covered with a plastic film) may be formed by the above-described method. Multilayer materials having multiple layers of elastic sheet and multiple layers of necked material such as, for example, palindromic laminates, may also be formed by the same method. The roll of material on the wind-up roll 94 may be heated to soften the elastic sheet so that the layers join to form a composite elastic necked-bonded material.

Alternatively, a necked material and a pressure sensitive elastomer adhesive sheet such as, for example, a pressure sensitive elastomer adhesive web of meltblown fibers may be joined by the above-described tensioned wind-up method. In that case, tension from the necked material provides pressure to activate the pressure sensitive elastomer adhesive sheet so that the layers join forming a composite elastic necked-bonded material.

The above-described tensioned wind-up bonding methods are suited for low basis weight elastomeric sheets. For example, elastic sheets may be used having basis weights less than 0.5 osy (ounces per square yard), for example, from about 0.25 to about 0.4 osy. Such extremely low basis weight sheets are useful for economic reasons, particularly in disposable products. Additionally, elastic sheets having higher basis weights such as, for example, from about 0.5 to about 10 osy may also be used.

With regard to the bonding pressure utilized when bonding is effected by the above-described tensioned wind-up method, specification of a bonding pressure does not, in itself, take into account complicating factors such as, for example, the bonding compatibility of elastic sheet and the necked materials and/or the basis weight weights of the materials. Nonetheless, one skilled in the art, taking into account such factors will readily be able to appropriately select and vary an effective bonding pressure.

Conventional drive means and other conventional devices which may be utilized in conjunction with the apparatus of FIG. 3 are well known and, for purposes of clarity, have not been illustrated in the schematic view of FIG. 3.

Figure 4:
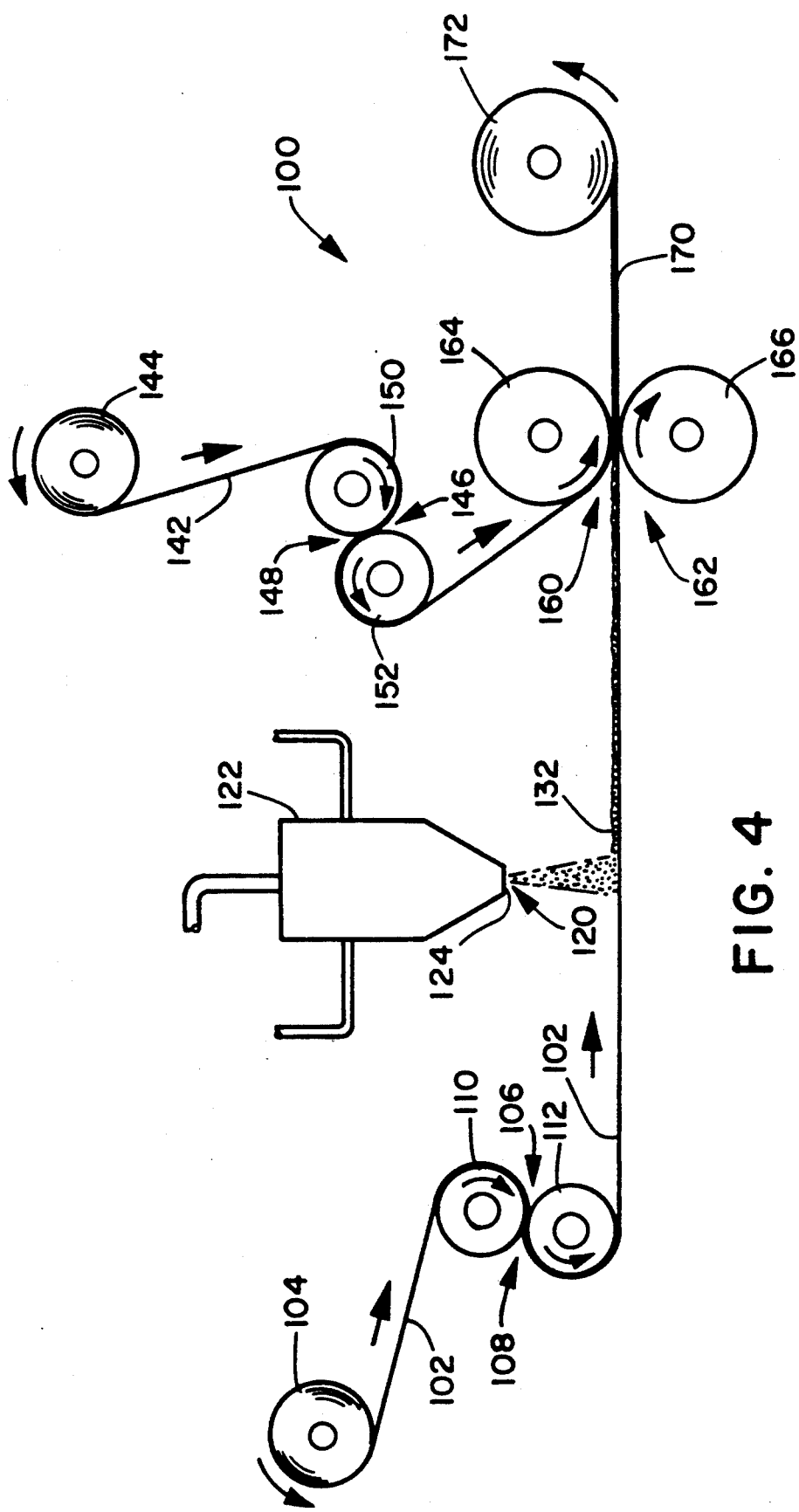
FIG. 4 is a schematic representation of an exemplary process for forming a composite elastic necked-bonded material by meltblowing an elastic web between two necked material layers.

Referring now to FIG. 4 of the drawings, there is schematically illustrated at 100 an exemplary process for forming a composite elastic material by meltblowing a web of elastic fibers onto a first necked material, overlaying a second necked material and then joining the layers with a bonder roller arrangement.

A first neckable material 102 is unwound from a supply roll 104. The neckable material 102 then travels in the direction indicated by the arrow associated therewith as the supply roll 104 rotates in the direction of the arrow associated therewith. The neckable material 102 then passes through a nip 106 of an S-roll arrangement 108 formed by the stack rollers 110 and 112. The neckable material 102 may be formed by nonwoven extrusion processes, such as, for example, spunbonding or meltblowing processes, and then passed directly through the nip 106 of the S-roll arrangement 108 without first being stored on a supply roll.

The neckable material 102 then passes through the nip 106 of the S-roll arrangement 108 in a reverse S-wrap path as indicated by the rotation direction arrows associated with the stack rollers 110 and 112. Because the peripheral linear speed of the rollers of the S-roll arrangement 108 is controlled to be lower than the peripheral linear speed of the rollers of the bonder roller arrangement 162, the neckable material 102 is tensioned so that it necks a desired amount and is maintained in such tensioned, necked condition as the elastic sheet 132 is formed directly on the nonelastic material.

As the necked material 102 passes under the meltblowing process equipment 122, an elastic sheet 132 of meltblown fibers 120 is formed directly on the necked material 102. The meltblown fibers 120 ma include meltblown microfibers.

Generally, any suitable elastomeric fiber forming resins or blends containing the same may be utilized for the nonwoven webs of elastomeric fibers of the invention and any suitable elastomeric film forming resins or blends containing the same may be utilized for the elastomeric films of the invention.

The elastic sheet 132 of meltblown fibers 120 may be formed from elastomeric polymers such as, for example, block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. One such block copolymer may be, for example, KRATON G-1657.

Other exemplary elastomeric materials which may be used to form the elastic sheet 132 include elastomeric polyester materials, elastomeric polyurethane materials and elastomeric polyamide materials. The elastic sheet 132 may also be a pressure sensitive elastomer adhesive sheet. For example, the elastic sheet 132 may be formed from a blend of about 63% by weight KRATON G-1657, 20% polyethylene NA-601, and 17% REGALREZ 1126 having a melt flow of from about 12 grams per ten minutes to about 18 grams per ten minutes when measured at 190° C. and under a 2160 gram load; an elongation of about 750%; a modulus of elongation at 100% of from about 155 to about 200 psi; and a modulus of elongation at 300% of from about 200 to about 250 psi. More particularly, the KRATON G block copolymer may have a melt flow of about 15 grams per ten minutes when measured at 190° C. and under a 2160 gram load; an elongation of about 750%; a modulus of elongation at 100% of about 175 psi; and a modulus of elongation at 300% of about 225 psi. Such materials are described, for example, in previously referenced U.S. Pat. No. 4,789,699 filed Oct. 15, 1986 of J. S. Keiffer and T. J. Wisneski for "Ambient Temperature Bondable Elastomeric Nonwoven Web."

Additionally, the elastic sheet 132 may be a composite material in that it may be made of two or more individual coherent webs or it may be made of one or more webs individually containing a mixture of elastic and nonelastic fibers. An example of the latter type of elastic web is described in previously referenced U.S. Pat. No. 4,209,563. Another example of such a composite web would be one made by a technique such as disclosed in previously referenced U.S. Pat. No. 4,100,324.

A stream of elastomeric meltblown fibers 120 is directed from the meltblowing process equipment 122 on to the necked material 102 at a high velocity while the fibers are in a softened state so that bonding and/or entangling occurs between the deposited elastomeric sheet 132 of meltblown fibers 120 and the necked material 102.

Generally, the meltblown fibers 120 bond adequately to the necked material when the fibers have an initial high velocity, for example, from about 300 feet per second to about 1000 feet per second. Additionally, the vertical distance from the forming nozzle 124 of the meltblowing process equipment 122 to the necked material 102 may range from about 4 to about 18 inches. For example, the vertical distance may be set at about 12 inches. The elastic sheet 132 may also be formed by other known extrusion processes such as, for example, known film extrusion processes.

A second neckable material 142 is unwound from a supply roll 144. The neckable material 142 then travels in the direction indicated by the arrow associated therewith as the supply roll 144 rotates in the direction of the arrow associated therewith. The neckable material 142 then passes through a nip 146 of an S-roll arrangement 148 formed by the stack rollers 150 and 152. Alternatively, the neckable material 142 may be formed by known nonwoven extrusion processes, such as, for example, known spunbonding or known meltblowing processes, and then passed directly through the nip 146 of the S-roll arrangement 148 without first being stored on a supply roll.

The neckable material 142 passes through the nip 146 of the S-roll arrangement 148 in a reverse S-wrap path as indicated by the rotation direction arrows associated with the stack rollers 150 and 152. Because the peripheral linear speed of the rollers of the S-roll arrangement 148 is controlled to be less than the peripheral linear speed of the rollers of the bonder roller arrangement 162, the neckable material 142 is tensioned so that it necks a desired amount and is maintained in such tensioned, necked condition as it is overlaid on the elastic sheet 132 and the necked material 102. The three layers are passed through the nip 160 of a bonder roller arrangement 162 to produce a composite elastic necked bonded material 170 which is wound on a wind-up roll 172.

The bonder roller arrangement 162 may be a patterned calender roller 164 arranged with a smooth anvil roller 166. Alternatively, a smooth calender roller may be used. One or both of the calender roller 164 and the anvil roller 166 may be heated and the pressure between these two rollers may be adjusted by well-known means to provide the desired temperature and bonding pressure. Other methods may be used to join the layers such as, for example, adhesives, ultrasonic welding, laser beams, and/or high energy electron beams. The bond surface area on the composite elastic necked bonded laminate 170 may approach about 100 percent and still provide a material with good stretch properties. Alternatively, a bond pattern may be used such as, for example, the sinusoidal dot pattern shown in FIG. 5.

The elastic sheet 132 may also be a pressure sensitive elastomer adhesive sheet such as, for example, a pressure sensitive elastomer adhesive web of meltblown fibers. In such case, joining the necked material layers 102 and 142 to the pressure sensitive elastomer adhesive sheet 132 may be accomplished by pressure bonding techniques such as, for example, pressure bonder rollers or tensioned wind-up methods.

Conventional drive means and other conventional devices which may be utilized in conjunction with the apparatus of FIG. 4 are well known and, for purposes of clarity, have not been illustrated in the schematic view of FIG. 4.

EXAMPLES 1-7

The composite elastic necked-bonded materials of examples 1-7 were made by joining an elastic sheet to at least one necked material. Tables 1,3,5,7,8,10,12 and 14 provide Grab Tensile Test data for control samples and composite elastic necked-bonded material samples. The Grab Tensile Tests were performed on a constant rate of extension tester, Instron Model 1122 Universal Testing Instrument, using 4 inch by 6 inch samples. The following mechanical properties were determined for each sample: Peak Load, Peak Total Energy Absorbed and Percent Elongation.

The samples were also cycled on the Instron Model 1122 with Microcon II—50 kg load cell and the results reported on Tables 2,4,6,9,11 and 13. The jaw faces of the tester were 1 inch by 3 inches so the samples were cut to 3 inches by 7 inches (7 inches in the direction to be tested) and weighed individually in grams. A 4 inch gauge length was used. Chart and crosshead speeds were set for 20 inches per minute and the unit was zeroed, balanced and calibrated according to the standard procedure. The maximum extension limit for the cycle length was set at a distance determined by calculating 56 percent of the "elongation to break" from the Grab Tensile Test. The samples were cycled to the specified cycle length four times and then were taken to break on the fifth cycle. The test equipment was set to report Peak Load in pounds force, Peak Elongation in percent and Peak Energy Absorbed in inch pounds force per square inch. The area used in the energy measurements (i.e., the surface area of material tested) is the gauge length (four inches) times the sample width (3 inches) which equals twelve square inches. The results of the Grab Tensile tests and cycle tests have been normalized for measured basis weight.

Peak Total Energy Absorbed (TEA) as used herein is defined as the total energy under a stress versus strain (load versus elongation) curve up to the point of "peak" or maximum load. TEA is expressed in units of work/(length)$^2$ or (pounds force * inch)/(inches)$^2$. These values have been normalized by dividing by the basis weight of the sample in ounces per square yard (osy) which produces units of $[(lbs_f*inch)/inch^2]/osy$.

Peak Load as used herein is defined as the maximum load or force encountered in elongating the sample to break. Peak Load is expressed in units of force (lbsf) which have been normalized for the basis weight of the material resulting in a number expressed in units of $lbs_f/(osy)$.

Elongation as used herein is defined as relative increase in length of a specimen during the tensile test. Elongation is expressed as a percentage, i.e., [(increase in length)/(original length)] × 100.

Permanent Set after a stretching cycle as used herein is defined as a ratio of the increase in length of the sample after a cycle divided by the maximum stretch during cycling. Permanent Set is expressed as a percentage, i.e., [(final sample length—initial sample length)/(maximum stretch during cycling—initial sample length)] × 100. Permanent Set is related to recovery by the expression [permanent set = 100 = recovery] when recovery is expressed as a percentage. In the Tables, the value reported in the permanent set row at the column titled "To Break" is the value for Peak Elongation unless otherwise noted.

EXAMPLE 1

Neckable Spunbonded Material

An neckable web of spunbonded polypropylene having a basis weight of about 0.8 ounces per square yard (osy) was tested on an Instron Model 1122 Universal Testing Instrument. The results are reported in Tables 1 and 2 under the heading "Control 1". The machine direction total energy absorbed is given in the column of Table 1 entitled "MD TEA". The machine direction peak load is given in the column entitled "MD Peak Load". The machine direction elongation to break is given in the column entitled "MD Elong". The cross-machine direction total energy absorbed is given in the column entitled "CD TEA". The cross-machine direction peak load is given in the column entitled "CD Peak Load". The cross-machine direction elongation to break is given in the column entitled "CD Elong".

The Peak TEA, Peak Load, and Permanent Set is given for each stretch cycle in Table 2. At the end of the series of cycles, the sample was elongated to break and the results reported under the heading "To Break".

Elastic Sheet

A blend of about 63% by weight KRATON G-1657, 20% polyethylene NA-601 and 17% REGALREZ 1126 having a melt flow of about 15 grams per ten minutes when measured at 190° C. and under a 2160 gram load; an elongation of about 750%; a modulus of elongation at 100% of about 175 psi; and a modulus of elongation at 300% of about 225 psi was formed into an elastic sheet of meltblown fibers utilizing recessed die tip meltblowing process equipment having a 0.090 inch recess and a 0.067 inch air gap. The equipment was operated under the following conditions: die zone temperature about 540° F.; die polymer melt temperature about 535° F.; barrel pressure 580 psig; die pressure 190 psig; polymer throughput 2 pounds per hour; forming drum vacuum about 2 inches of water; horizontal forming distance about 12 inches; vertical forming distance about 12 inches and winder speed about 19 feet per minute. An elastic web of meltblown fibers was formed having a basis weight of about 105 grams per square meter. The sheet was tested on the Instron Model 1122 Universal Testing Instrument and the results are given in Tables 1 and 2 under the leading "Elastomer." Data collected in the last cycle (i.e. "to 176%") for the elastic sheet control material was read at the break elongation for the composite elastic necked-bonded material shown as 176% at Table 2 in the "To Break" column and the "perm set" row for "Composite 1".

Composite Elastic Neck-Bonded Material

The neckable spunbond polypropylene material having a basis weight of 0.8 osy and an initial width of about 17.75 inches was unwound on a "22 inch Face Coating Line rewinder" made by the Black-Clawson Company. The wind-up speed was set at about 4 to about 5 feet per minute and the unwind resistance force was set at 48 pounds per square inch causing the material to neck or constrict to a width of about 8.5 to about 8.75 inches as it was wound on a roll.

At the wind-up roll, the elastic sheet of meltblown fibers described above having a basis weight of about 105 grams per square meter, was overlaid on the tensioned, necked material so that the two webs wound together on the wind up roll. The elastic sheet had a thin plastic film on one surface so it would stick to only one adjacent tensioned, necked layer of material.

Figure 5:
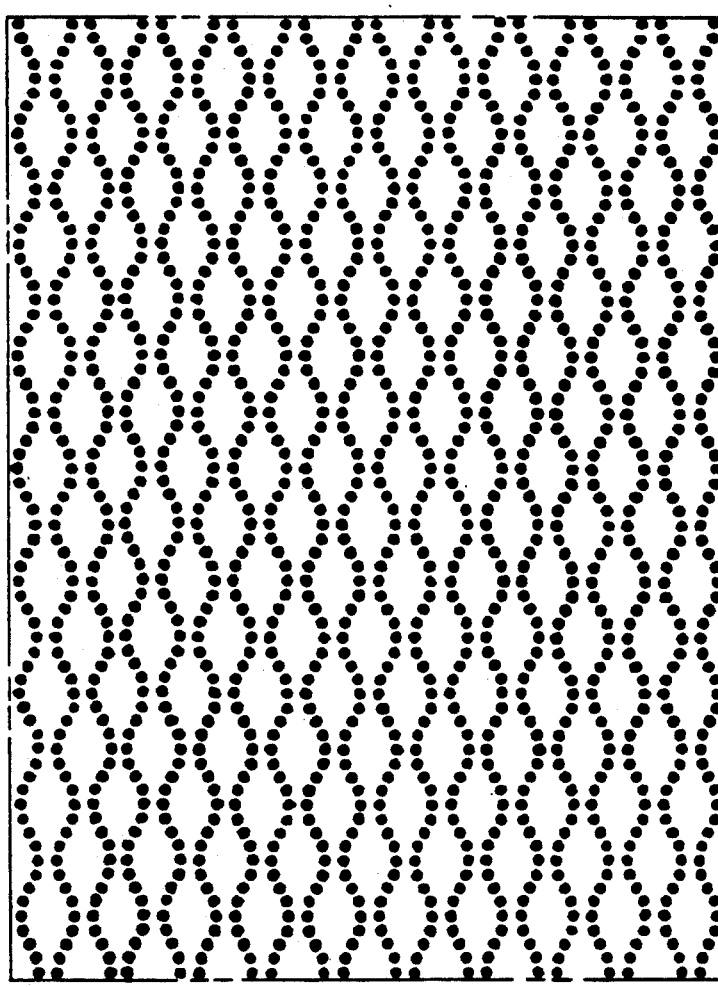
FIG. 5 is a representation of an exemplary bonding pattern used to join components of a composite elastic necked-bonded material.

The tightly wound roll was unwound and bonded using an engraved calender roller having the pattern shown in FIG. 5. The bond pattern of the engraved roller had approximately 75 pins or bond points per square inch. Each pin had a diameter of about 0.059 inch to produce bond area of about 20.5 percent. The bond rollers were maintained at room temperature (about 75° F.), bond pressure was set at about 20 pounds per square inch, and the line was operated at a speed of from about 7 to about 10 feet per minute.

The composite elastic neck-bonded material was tested on the Instron Model 1122 Universal Testing Instrument and the results are given in Tables 1 and 2 under the heading "Composite 1".

COMPARATIVE EXAMPLE 1

Reversibly Necked Spunbonded material

The neckable spunbonded polypropylene material described above having a basis weight of 0.8 osy and an initial width of about 17.75 inches was unwound on a "22 inch Face Coating Line rewinder" made by the Black-Clawson Company. The wind-up speed was set at about 4 to about 5 feet per minute and the unwind resistance force was set at 48 pounds per square inch causing the material to neck or constrict to a width of about 8 ½ to 8 ¾ inches as it was rewound on a roll. The roll of necked material was heated in a Fischer Econotemp TM Lab Oven Model 30F at 120° C. for 1 hour which was thought to be more than the amount of time required to heat the entire roll, i.e., the center of the roll, to the oven temperature for about 300 seconds. This heat treatment formed a reversibly necked material from the neckable material. The reversibly necked material was tested on the Instron Model 1122 Universal Testing Instrument and the results are reported in Tables 1 and 2 under the heading "Heat Set." Necking and heat treating the neckable spunbonded material decreased most tensile properties but increased the cross-machine direction stretch.

Properties of the reversibly necked material are shown in Tables 1 and 2 under the heading of "Heat Set". It can been seen by comparing the "Composite 1" with the "Elastomer 1" from the Tables that the necked layer of the composite elastic material appears to act as a positive stop, that is, a peak load of 1.69 for "Composite 1" compared to 0.43 for "Elastomer 1" at the break elongation of "Composite 1" (176%). The elastic layer lowers the normalized grab tensile strength data of the composite elastic necked-bonded material because the elastic layer adds weight but little strength, especially in the machine direction since the necked material has a low elongation to break in that direction. Permanent set is significantly lower in the composite elastic necked-bonded material than in the reversibly necked material.

EXAMPLE 2

Neckable Spunbonded Material

A neckable spunbonded polypropylene material having a basis weight of about 0.4 osy was tested on an Instron Model 1122 Universal Testing Instrument. The results are reported in Table 3 under the heading control 2.

Elastic Sheet

An elastic sheet of meltblown fibers as described in Example 1 and having a basis weight of about 70 grams per square meter was tested on an Instron Model 1122 Universal Testing Instrument. This elastic sheet had a plastic film on one surface to prevent the rolled-up material from sticking together. The results are reported in Tables 3 and 4 under the heading "Elastomer 2".

Composite Elastic Necked-Bonded Laminate

The neckable spunbonded polypropylene material and the elastic sheet of meltblown fibers were joined on a heated bonder roller arrangement. The bonder speed was set at 21 feet per minute, nip pressure was 355 pounds per linear inch, and the calender roller and anvil roller temperatures were set at 127° F. The elastic sheet was unwound from a supply roll at a rate of 21 feet per minute so there would be no tensioning of the elastic sheet. The neckable spunbonded polypropylene material was unwound from a supply roll at a rate of about 17 feet per minute or about 20 percent slower than the bonder. The difference in speed created a tension which caused the neckable material to neck before it was joined to the elastic sheet.

The composite elastic necked-bonded material produced in this manner was tested on the Instron Model 1122 Universal Testing Instrument and the results are given in Tables 3 and 4 under the heading "Composite 2". Compared to the Control material, the composite elastic necked-bonded material has lower tensile properties with equivalent machine direction stretch and significantly greater cross-machine direction stretch. Compared to the elastic sheet, the laminate has lower values for Peak Total Energy Absorbed (PTEA) but higher Peak Loads when going to break.

In cross-machine direction cycling (Table 4), the laminate has slightly lower PTEA, slightly greater Peak Load and equivalent values for permanent set. When taken to the break elongation for the laminate, the laminate has higher PTEA and Peak Load values than the elastomeric material.

EXAMPLE 3

A composite elastic necked-bonded material was prepared by joining a layer of the neckable spunbonded polypropylene material of Example 2 to each side of the elastic meltblown sheet of Example 2.

The neckable spunbonded polypropylene material and the elastic meltblown sheet were joined utilizing a heated bonder roller arrangement. The bonder speed was set at 21 feet per minute, nip pressure was 355 pounds per linear inch, and the calender roller and anvil roller temperatures were set at 127° F. The elastic sheet unwind was set at 21 feet per minute so there would be no tensioning of the elastic web. The neckable spunbonded polypropylene material unwinds were manually braked and were unwound at about 18 feet per minute.

The composite elastic necked-bonded material produced in this manner was tested on the Instron Model 1122 Universal Testing Instrument. Results for the Grab Tensile Test for the Control materials and the composite elastic material are given in Table 5 under the respective headings "Control 3" and "Composite 3A". Compared to the neckable spunbonded control material, all Grab Tensile Test results were lower for the composite elastic material except for the machine direction elongation which remained unchanged and the cross-machine direction elongation which is significantly increased. Compared to the elastic sheet, the composite elastic necked-bonded material has lower values for Peak Total Energy Absorbed and Elongation but greater values for Peak Loads. Table 6 shows the cross-machine direction stretching for the Elastomer 2 and Composite 3A demonstrating considerably greater Peak TEA and Peak Load during the final cycle.

COMPARATIVE EXAMPLE 3

A composite elastic material was prepared in which a layer of the neckable spunbonded polypropylene material of Example 2 was joined to each side of the elastic meltblown sheet of Example 2 except that the neckable material was not necked.

The neckable spunbonded polypropylene material and the meltblown elastic sheet were joined utilizing a heated bonder roller arrangement. The bonder speed was set at 21 feet per minute, nip pressure was 355 pounds per linear inch, and the calender roller and anvil roller temperatures were set at 127° F. The elastic sheet unwind was set at 21 feet per minute so there would be no tensioning of the elastic web. The neckable spunbonded polypropylene materials were unwound at about 21 feet per minute. No force was applied to brake any of the unwinds. Consequently, the neckable spunbonded materials were not necked and the elastic sheet was not stretched.

The composite elastic material produced in this manner was tested on the Instron Model 1122 Universal Testing Instrument and the results are given in Table 7 under the heading "Composite 3B". When compared to Composite 3A produced with the same materials at the same process conditions except that the spunbonded sheets were necked in for Composite 3A, properties were not changed much except the cross-machine direction elongation was significantly increased.

EXAMPLE 4

A neckable spunbonded polypropylene material was necked in two stages and then joined to each side of an elastic meltblown sheet utilizing a thermal bonder to produce a composite elastic necked-bonded material.

Two rolls of a neckable spunbonded polypropylene material having a basis weight of about 0.4 osy and an initial width of about 32 inches were wound on a Camachine 10 rewinder made by Cameron Machine Company of Brookland, N.Y. The wind-up roll was operated at a speed of about 42 feet per minute and the unwind roll operated at a speed of about 35 feet per minute causing the material to neck to a width of about 18 inches.

The two rolls of neckable spunbonded polypropylene having a necked width of about 18 inches were run through the "22 inch Face Pilot Coating Line" made by the Black-Clawson Company, Fulton, N.Y. The unwind roll was operated at a speed of about 5 feet per minute and the winder operated at a speed of from about 5 to about 8 feet per minute to further neck the spunbonded material to a final width of about 13.5 to about 14 inches. The two rolls of necked spunbonded material were put on the top and bottom positions of a three position roll unwind apparatus. The roll of elastic meltblown sheet from Example 2 was placed on the middle position.

The necked spunbonded material and the elastic meltblown sheet were joined utilizing a heated bonder roller arrangement. The bonder speed was set at 18 feet per minute, nip pressure was 355 pounds per linear inch, and the calender roller and anvil roller temperatures were set at 127° F. The elastic sheet unwind was set at 21 feet per minute so there would be no tensioning of the elastic web. The necked spunbonded material unwinds were set at about 19 feet per minute so that enough tension was created to keep the necked spunbonded material in the necked condition.

The composite elastic necked-bonded material produced in this manner was tested on the Instron Model 1122 Universal Testing Instrument and the results are given in Tables 8 and 9 under the heading "Composite 4". Compared to the elastic sheet, the composite elastic material has lower values for machine direction stretch and Peak Total Energy Absorbed and considerably higher peak load values (Table 8). Cycling values (Table 9) showed little change except at the breaking point of the composite elastic material where the peak load was about 5 times that of the pure elastomer.

EXAMPLE 5

Composite Elastic Neck-Bonded Material Having a Meltblown Elastic Layer Formed Directly on a Necked Material A neckable spunbonded polypropylene material having a basis weight of about 0.4 osy was unwound from a braked unwind roll at a speed of approximately 16 feet per minute and fed on to the forming drum of a meltblowing apparatus operating at a rate of 20 feet per minute. The difference in speed caused the material to constrict to about 35 percent of its original width.

A pressure sensitive elastomer adhesive web of meltblown fibers having a basis weight of about 40 grams per square meter was formed directly on the tensioned, necked material. The meltblown fibers were formed from a blend of about 63% by weight KRATON G-1657, 20% polyethylene NA-601 and 17% REGALREZ 1126 having a melt flow of about 15 grams per ten minutes when measured at 190° C. and under a 2160 gram load; an elongation of about 750%; a modulus of elongation at 100% of about 175 psi; and a modulus of elongation at 300% of about 225 psi utilizing meltblowing equipment having a 0.090 inch recess and a 0.067 inch air gap die tip arrangement. The meltblowing process equipment operated under the following conditions: die zone temperature about 500° F.; die polymer melt temperature about 493° F.; barrel pressure 320 psig; die pressure 151 psig; polymer throughput 0.9 pounds per hour; forming drum vacuum about 3 inches of water; horizontal forming distance about 12 inches; vertical forming distance about 14 inches and winder speed about 20 feet per minute.

The composite elastic neck-bonded material formed in this manner was tested on an Instron Model 1122 Universal Testing Instrument. The results are reported in Tables 10 and 11 under the heading "Meltblown Laminate."

COMPARATIVE EXAMPLE 5

A neckable spunbonded polypropylene material having a basis weight of about 0.4 osy was joined to an elastic web of meltblown fibers having a basis weight of about 70 grams per square meter utilizing a heated bonder roller arrangement according to the procedure of Example 2. The bonder speed was set at 21 feet per minute, nip pressure was 355 pounds per linear inch, and the calender roller and anvil roller temperatures were set at 127° F. The elastic web unwind was set at 21 feet per minute so that there would be no tensioning of the elastic web. The spunbonded polypropylene web unwind was set at 21 feet per minute but force was applied to the unwind brake so the unwind operated at about 17 feet per minute or about 20 percent slower than the bonder.

The composite elastic necked-bonded material produced in this manner was tested on the Instron Model 1122 Universal Testing Instrument and the results are given in Tables 10 and 11 under the heading "Composite 5".

Because the elastic component of the thermally bonded composite material had a basis weight that was approximately 50 percent greater than the basis weight of the elastic component of the meltblown composite material, the values for Peak Total Energy Absorbed in the Grab Tensile Tests, and the Peak Total Energy Absorbed and Peak Load for cycling are considerably higher than the meltblown composite material. When taken "to Break", the peak loads are similar because of the contribution by the necked spunbonded material.

EXAMPLE 6

A neckable spunbonded polypropylene material having a basis weight of about 0.4 ounces per square yard and an initial width of about 40 inches was necked to a width of about 19 inches and run under a film extrusion apparatus at a rate of 130 feet per minute. A film was formed from a blend of about 63% by weight KRATON G-1657, 20% polyethylene NA-601 and 17% REGALREZ 1126. Added to the blend was about 2 percent by weight Ampacet White concentrate Type 41171 Titanium Dioxide (TiO$_2$) pigment available from the Ampacet Corporation, Mt. Vernon, N.Y. The blend had a melt flow of about 15 grams per ten minutes when measured at 190° C. and under a 2160 gram load; an elongation of about 750%; a modulus of elongation at 100% of about 175 psi; and a modulus of elongation at 300% of about 225 psi and was extruded on the spunbonded polypropylene web at a rate of about 5.4 pounds per inch per hour. The thickness of the extruded film was about 1 mil.

The composite elastic necked-bonded material produced in this manner was tested on the Instron Model 1122 Universal Testing Instrument and the results are given in Tables 12 and 13 under the heading "Composite 6". The test results of the composite material formed by meltblowing an elastic web onto the tensioned, necked material (Example 5) are also shown in the tables for comparison. The KRATON G film appears to give much more strength to the composite elastic necked-bonded material than the elastic web of meltblown fibers. It can be seen that the values for the cycling Peak Total Energy Absorbed and Peak Load are from 400 to 500 percent greater for the material having the 1 mil extruded elastic film than for the material having a meltblown web. The values measured "to Break" are about 50 to 100 percent greater for the material having the mil extruded film than for the material having a meltblown web.

EXAMPLE 7

Two neckable webs of spunbonded polypropylene having basis weights of about 0.4 osy were joined to each side of an elastic meltblown web according to the procedure of Comparative Example 3. The neckable material remained un-necked and the resulting composite material was not a composite elastic necked-bonded material. The neckable spunbonded polypropylene material and the composite material were tested on the Instron Model 1122 Universal Testing Instrument and the results are given in Table 14 under the respective headings Control 7A, Control 7B, Composite 7, and Normalized Composite 7.

The test results normalized for the total basis weight show that the composite material formed in this manner is much weaker than the neckable spunbonded materials, that is, Composite 7 versus Control 7A and 7B. However, if the test results are normalized to eliminate the weight contribution of the elastic meltblown web, the test results for the composite material are comparable to the neckable spunbonded materials, that is, Spunbond Normalized Composite 7 versus Control 7A and 7B. In view of these results, the elastic layer makes little contribution to the measured Grab Tensile Test properties of the composite material when the composite material has a maximum elongation that is much less than the elongation of the elastic material.

RELATED APPLICATIONS

This application is one of a group of commonly assigned patent applications which are being filed on the same date. The group includes application Ser. No. 07/249,050 now U.S. Pat. No. 4,965,127 in the name of Michael T. Morman and entitled "Reversibly Necked Material and Process to Make It"; and application Ser. No. 07/248,833 now U.S. Pat. No. 4,981,747 entitled "Composite Elastic Material Including a Reversibly Necked Material" and also in the name of Michael T. Morman. The subject matter of these applications is hereby incorporated herein by reference.

Disclosure of the presently preferred embodiment of the invention is intended to illustrate and not to limit the invention. It is understood that those of skill in the art should be capable of making numerous modifications without departing from the true spirit and scope of the invention.

TABLE 1

| GRAB TENSILES: | | |
|---|---|---|
| | Control 1 | Heat Set |
| MD TEA | 1.05 ± .11 | .25 ± .02 |
| MD Peak Load | 15.8 ± 1.25 | 12 ± 3 |
| MD Elong | 46 ± 2 | 16 ± 1 |
| CD TEA | .89 ± .22 | .26 ± .06 |
| CD Peak Load | 13.2 ± 1.9 | 3.7 ± .6 |
| CD Elong | 50 ± 7 | 143 ± 10 |

TABLE 1-continued

GRAB TENSILES:

|  | Elastomer 1 | Composite 1 |
|---|---|---|
| MD TEA | 1.22 ± .13 | .13 ± .03 |
| MD Peak Load | 1.36 ± .09 | 2.8 ± .24 |
| MD Elong | 581 ± 40 | 30 ± 3 |
| CD TEA | .84 ± .2 | .32 ± .04 |
| CD Peak Load | .93 ± .12 | 1.66 ± .22 |
| CD Elong | 574 ± 95 | 204 ± 11 |

TABLE 2

| CYCLE: | 1 | 2 | 3 | 4 | |
|---|---|---|---|---|---|
| Control 1, Cycled in the cross-machine direction at 38% CD elongation | | | | | To Break |
| Peak TEA | .932 ± .02 | .28 ± .01 | .24 ± .005 | .21 ± .01 | .50 ± .26 |
| Peak Load | 13.8 ± .2 | 11.8 ± .3 | 11.0 ± .1 | 10.4 ± .3 | 13.8 ± 1.7 |
| Perm. Set | 45. ± 3 | 49 ± 2 | 53 ± 1 | 55 ± 1 | 45 ± 4 |
| Heat Set, Cycled in the cross-machine direction at 80% CD elongation | | | | | |
| Peak TEA | .014 ± .001 | .004 ± .001 | .002 ± .001 | .002 ± .001 | .37 ± .12 |
| Peak Load | .21 ± .01 | .19 ± .01 | .18 ± .01 | .18 ± .01 | 4.06 ± .65 |
| Perm. Set | 22 ± 1 | 25 ± 1 | 28 ± 1 | 37 ± 3 | 143 ± 7 |
| Composite 1, Cycled in the cross-machine direction at 109% CD elongation | | | | | |
| Peak TEA | .10 ± .01 | .06 ± .005 | .06 ± .005 | .053 ± .005 | .285 ± .04 |
| Peak Load | .528 ± .08 | .48 ± .06 | .47 ± .05 | .46 ± .06 | 1.69 ± .2 |
| Perm. Set | 9 ± 1 | 10 ± .5 | 11.2 ± 1 | 11.4 ± 3 | 176 ± 12 |
| Elastomer 1, Cycled in the cross-machine direction at 109% CD elongation | | | | | To 176% |
| Peak TEA | .076 ± .001 | .056 ± .001 | .054 ± .001 | .052 ± .001 | .13 ± .01(N = 2) |
| Peak Load | .344 ± .004 | .33 ± .004 | .32 ± .003 | .317 ± .004 | .43 ± .01(N = 2) |
| Perm. Set | 8 ± 0 | 9 ± 0 | 10 ± 0 | 10.8 ± .4 | |

TABLE 3

GRAB TENSILES:

|  | Control 2 | Composite 2 |
|---|---|---|
| MD TEA | .96 ± .24 | .35 ± .05 |
| MD Peak Load | 15.2 ± 2.75 | 4.57 ± .2 |
| MD Elong | 42.5 ± 6 | 50 ± 5 |
| CD TEA | 1.08 ± .38 | .54 ± .15 |
| CD Peak Load | 14.1 ± 2.7 | 2.45 ± .3 |
| CD Elong | 53 ± 8 | 217 ± 23 |

|  | Elastomer 2 | |
|---|---|---|
| MD TEA | 1.12 ± .34 | |
| MD Peak Load | 1.54 ± .17 | |
| MD Elong | 427 ± 93 | |
| CD TEA | .83 ± .03 | |
| CD Peak Load | 1.22 ± .05 | |
| CD Elong | 407 ± 17 | |

TABLE 4

| CYCLE: | 1 | 2 | 3 | 4 | |
|---|---|---|---|---|---|
| Elastomer 2, Cycled in the cross-machine direction at 129% CD elongation | | | | | To 235% |
| Peak TEA | .17 ± .006 | .11 ± .004 | .10 ± .004 | .10 ± .004 | .33 ± .03 |
| Peak Load | .60 ± .02 | .55 ± .02 | .54 ± .02 | .53 ± .02 | .765 ± .06 |
| Perm. Set | 8 ± 0 | 10 ± .5 | 11 ± .5 | 13 ± 2 | |
| Composite 2, Cycled in the cross-machine direction at 122% CD elongation | | | | | To Break |
| Peak TEA | .154 ± .02 | .086 ± .01 | .078 ± .01 | .074 ± .005 | .72 ± .15 |
| Peak Load | .96 ± .26 | .854 ± .21 | .82 ± .21 | .79 ± .20 | 2.74 ± .38 |
| Perm. Set | 9 ± 1 | 11 ± 1 | 13 ± 2 | 14 ± 2 | 218 ± 24 |

TABLE 5

GRAB TENSILES:

|  | Control 5 | Composite 3A |
|---|---|---|
| MD TEA | .96 ± .24 | .34 ± .06 |
| MD Peak Load | 15.2 ± 2.75 | 4.7 ± .6 |
| MD Elong | 42.5 ± 6 | 55 ± 4 |
| CD TEA | 1.08 ± 0.38 | .48 ± .08 |
| CD Peak Load | 14.1 ± 2.7 | 4.3 ± .4 |
| CD Elong | 53 ± 8 | 97 ± 8 |

|  | Elastomer 2 | |
|---|---|---|
| MD TEA | 1.12 ± .34 | |
| MD Peak Load | 1.54 ± .17 | |
| MD Elong | 427 ± 93 | |
| CD TEA | .83 ± .03 | |
| CD Peak Load | 1.22 ± .05 | |
| CD Elong | 407 ± 17 | |

TABLE 6

| CYCLE: | 1 | 2 | 3 | 4 | |
|---|---|---|---|---|---|
| Elastomer 2, Cycled in the cross-machine direction at 60% CD elongation | | | | | To 90% |
| Peak TEA | .067 ± .002 | .048 ± .002 | .046 ± .001 | .045 ± .002 | .103 ± .002 |
| Peak Load | .553 ± .01 | .517 ± .012 | .50 ± .01 | .50 ± .01 | .65 ± .01 |
| Perm. Set | 7 ± 0 | 8 ± 0 | 8 ± 0 | 9 ± 1 | |
| Composite 3A, Cycled in the cross-machine direction at 55% CD elongation | | | | | To Break |
| Peak TEA | .19 ± .04 | .082 ± .02 | .07 ± .01 | .065 ± .01 | .484 ± .06 |
| Peak Load | 2.66 ± .35 | 2.37 ± .33 | 2.24 ± .31 | 2.16 ± .28 | 4.08 ± .35 |

TABLE 6-continued

| CYCLE: | 1 | 2 | 3 | 4 | |
|---|---|---|---|---|---|
| Perm. Set | 18 ± 1 | 20 ± 2 | 22 ± 3 | 24 ± 2 | 91 ± 4 |

TABLE 7

| GRAB TENSILES: | | |
|---|---|---|
| | Composite 3B | Composite 3A |
| MD TEA | .43 ± .07 | .34 ± .06 |
| MD Peak Load | 5.8 ± .51 | 4.7 ± .6 |
| MD Elong | 52 ± 6 | 55 ± 4 |
| CD TEA | .41 ± .09 | .48 ± .08 |
| CD Peak Load | 5.25 ± .75 | 4.3 ± .4 |
| CD Elong | 55 ± 5 | 97 ± 8 |

TABLE 8

| GRAB TENSILES: | | |
|---|---|---|
| | Elastomer 2 | Composite 4 |
| MD TEA | 1.12 ± .34 | .33 ± .06 |
| MD Peak Load | 1.54 ± .17 | 5.8 ± .49 |
| MD Elong | 427 ± 93 | 48 ± 4 |
| CD TEA | .83 ± .03 | .60 ± .09 |
| CD Peak Load | 1.22 ± .05 | 3.1 ± .5 |
| CD Elong | 407 ± 17 | 229 ± 12 |

TABLE 9

| CYCLE: | 1 | 2 | 3 | 4 | |
|---|---|---|---|---|---|
| Elastomer 2, Cycled in the cross-machine direction at 129% CD elongation | | | | | |
| | | | | | To 235% |
| Peak TEA | .17 ± .006 | .11 ± .004 | .10 ± .004 | .10 ± .004 | .33 ± .03 |
| Peak Load | .60 ± .02 | .55 ± .02 | .54 ± .02 | .53 ± .02 | .76 ± .06 |
| Perm. Set | 8 ± 0 | 10 ± 1 | 11 ± 1 | 13 ± 2 | |
| Composite 4, Cycled in the cross-machine direction at 129% CD elongation | | | | | |
| | | | | | To Break |
| Peak TEA | .175 ± .025 | .08 ± .01 | .07 ± .004 | .07 ± .004 | .85 ± .07 |
| Peak Load | .89 ± .2 | .77 ± .2 | .71 ± .16 | .69 ± .14 | 3.60 ± .5 |
| Perm. Set | 13 ± 1 | 15 ± 1 | 15 ± 1 | 18 ± 1 | 235 ± 14 |

TABLE 10

| GRAB TENSILES: | | |
|---|---|---|
| | Composite 5 | Meltblown Laminate |
| MD TEA | .35 ± .05 | .17 ± .04 |
| MD Peak Load | 4.57 ± .21 | 4.3 ± .35 |
| MD Elong | 50 ± 5 | 24 ± 3 |
| CD TEA | .54 ± .15 | .38 ± .03 |
| CD Peak Load | 2.45 ± .31 | 2.4 ± .2 |
| CD Elong | 217 ± 23 | 210 ± 10 |

TABLE 11

| CYCLE: | 1 | 2 | 3 | 4 | To Break |
|---|---|---|---|---|---|
| Composite 5, Cycled in the cross-machine direction at 122% CD elongation | | | | | |
| Peak TEA | .154 ± .02 | .086 ± .01 | .078 ± .008 | .074 ± .005 | .719 ± .15 |
| Peak Load | .96 ± .26 | .85 ± .21 | .82 ± .21 | .80 ± .20 | 2.74 ± .4 |
| Perm. Set | 9 ± 1 | 11 ± 1 | 13 ± 2 | 14 ± 2 | 218 ± 24 |
| Meltblown Laminate, Cycled in the cross-machine direction at 119% CD elongation | | | | | |
| Peak TEA | .089 ± .01 | .051 ± .005 | .047 ± .004 | .045 ± .004 | .512 ± .064 |
| Peak Load | .429 ± .04 | .379 ± .04 | .36 ± .03 | .35 ± .03 | 2.5 ± .14 |
| Perm. Set | 10 ± 1 | 12 ± 1 | 13 ± 1 | 19 ± 6 | 218 ± 10 |

TABLE 12

| GRAB TENSILES: | | |
|---|---|---|
| | Meltblown Laminate | Composite 6 |
| MD TEA | .17 ± .04 | .28 ± .08 |
| MD Peak Load | 4.3 ± .35 | 5.7 ± .4 |
| MD Elong | 24 ± 3 | 34 ± 7 |
| CD TEA | .38 ± .03 | .96 ± .13 |
| CD Peak Load | 2.4 ± .2 | 3.9 ± .3 |
| CD Elong | 210 ± 10 | 215 ± 16 |

TABLE 13

| CYCLE: | 1 | 2 | 3 | 4 | To Break |
|---|---|---|---|---|---|
| Meltblown Laminate 1, Cycled in the cross-machine direction at 119% CD elongation | | | | | |
| Peak TEA | .09 ± .01 | .051 ± .005 | .047 ± .004 | .045 ± .004 | .51 ± .06 |
| Peak Load | .43 ± .04 | .38 ± .03 | .36 ± .03 | .35 ± .03 | 2.50 ± .14 |
| Perm. Set | 10 ± 1 | 12 ± 1 | 13 ± 1 | 19 ± 6 | 219 ± 10 |
| Composite 6, Cycled in the cross-machine direction at 121% CD elongation | | | | | |
| Peak TEA | .436 ± .03 | .214 ± .01 | .20 ± .01 | .19 ± .01 | .93 ± .11 |
| Peak Load | 1.98 ± .3 | 1.80 ± .29 | 1.72 ± .29 | 1.67 ± .28 | 3.84 ± .21 |
| Perm. Set | 10 ± 1 | 11 ± 1 | 12 ± 1 | 13 ± 1 | 196 ± 15 |

TABLE 14

| GRAB TENSILES: | | |
|---|---|---|
| | Control 7A | Control 7B |
| MD TEA | .88 ± .26 | 1.05 ± .2 |
| MD Peak Load | 15.9 ± 4 | 14.5 ± 2 |
| MD Elong | 37 ± 5 | 48 ± 7 |

TABLE 14-continued

| GRAB TENSILES: | | |
|---|---|---|
| CD TEA | .90 ± .36 | 1.25 ± .4 |
| CD Peak Load | 12.7 ± 3 | 15.5 ± 2.6 |
| CD Elong | 51 ± 8 | 55 ± 8 |

| | Composite 7 | Spunbond Normalized Composite 7 |
|---|---|---|
| MD TEA | .43 ± .07 | 1.33 ± .22 |
| MD Peak Load | 5.8 ± .51 | 18 ± 1.58 |
| MD Elong | 52 ± 6 | — |
| CD TEA | .41 ± .09 | 1.27 ± .28 |
| CD Peak Load | 5.25 ± .75 | 16.3 ± 2.3 |
| CD Elong | 55 ± 5 | — |

| Elastomer 2 | |
|---|---|
| MD TEA | 1.12 ± .34 |
| MD Peak Load | 1.54 ± .17 |
| MD Elong | 427 ± 93 |
| CD TEA | .83 ± .03 |
| CD Peak Load | 1.22 ± .05 |
| CD Elong | 407 ± 17 |

What is claimed is:

1. A method of producing a composite elastic necked-bonded material comprising:
   providing at least one neckable nonelastic material;
   applying a tensioning force to the neckable nonelastic material to neck said material;
   superposing the necked nonelastic material on an elastic sheet; and
   joining said tensioned, necked nonelastic material and said elastic sheet at least at two places.

2. The method of claim 1 wherein said elastic sheet is an elastic web of meltblown fibers.

3. The method of claim 1 wherein said elastic sheet comprises an elastomeric polymer selected from the group consisting of elastic polyesters, elastic polyurethanes, elastic polyamides, and elastic A-B-A' block copolymers wherein A and A' are the same or different thermoplastic polymer, and wherein B is an elastomeric polymer block.

4. The method of claim 2 wherein said meltblown fibers includes meltblown microfibers.

5. The method of claim 1 wherein said neckable material is a material selected from the group consisting of knitted fabrics and loosely woven fabrics.

6. The method of claim 1 wherein said neckable material is a web selected from the group consisting of a bonded carded web of fibers, a web of spunbonded fibers, a web of meltblown fibers, and a multilayer material including at least one of said webs.

7. The method of claim 6 wherein said fibers comprise a polymer selected from the group consisting of polyolefins, polyesters, and polyamides.

8. The method of claim 7 wherein said polyolefin is selected from the group consisting of one or more of polyethylene, polypropylene, polybutene, ethylene copolymers, propylene copolymers, and butene copolymers.

9. The method of claim 8 wherein said neckable material is a composite material comprising a mixture of fibers and one or more other materials selected from the group consisting of wood pulp, staple fibers, particulates and super-absorbent materials.

10. The method of claim 6 wherein said meltblown web includes meltblown microfibers.

11. The method of claim 1 wherein said elastic sheet is formed directly on said tensioned, necked nonelastic material.

12. A method of producing a composite elastic necked-bonded material comprising:
    providing at least one neckable nonelastic nonwoven web selected from the group consisting of a bonded carded web of fibers, a web of spunbonded fibers, a web of meltblown fibers, and a multilayer material including at least one of said webs;
    applying a tensioning force to the neckable nonelastic nonwoven web to neck said material;
    superposing the necked material on a pressure sensitive elastomer adhesive sheet; and
    joining said tensioned, necked material and said pressure sensitive elastomer adhesive sheet by winding them together onto a wind-up roll so that the tensioning force from said necked material activates the pressure sensitive elastomer adhesive sheet and bonds the necked material to the sheet.

13. The method of claim 12 wherein the pressure sensitive elastomeric adhesive nonwoven web of meltblown fibers is formed directly on the tensioned, necked nonelastic nonwoven web.

14. The method of claim 12 wherein the pressure sensitive elastomeric adhesive nonwoven web of meltblown fibers includes microfibers.

15. The method of claim 1 wherein said elastic sheet is a pressure sensitive elastomer adhesive sheet.

16. The method of claim 15 wherein said pressure sensitive elastomer adhesive sheet is formed from a blend of an elastomeric polymer and a tackifying resin.

17. The method of claim 16 wherein said blend further includes a polyolefin.

18. The method of claim 15 wherein said pressure sensitive elastomer adhesive sheet is a pressure sensitive elastomer adhesive web of meltblown fibers.

19. The method of claim 18 wherein said meltblown fibers include meltblown microfibers.

* * * * *

UNITED STATES PATENT AND TRADEMARK OFFICE
CERTIFICATE OF CORRECTION

PATENT NO. : 5,226,992
DATED : July 13, 1993
INVENTOR(S) : Michael T. Morman

It is certified that error appears in the above-identified patent and that said Letters Patent is hereby corrected as shown below:

Column 4, line 8, "may by joined by using" should read --may be joined by using--;

Column 6, line 55, "the elastic sheet 12 may" should read --the elastic sheet 32 may"--;

Column 7, line 59, "tackifying resins., and" should read --tackifying resins, and--;

Column 11, line 35, "fibers 120 ma include" should read --fibers 120 may include--;

Column 15, line 38, "Necked Spunbonded material" should read --Necked Spunbonded Material--;

Column 16, line 15-16, "under the heading control 2." should read --under the heading "control 2"--;

Columns 20-25, Tables 1-14, should not be broken up or separated, therefore they should read as follows:

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 1

GRAB TENSILES:

|  | Control 1 | Heat Set |
|---|---|---|
| MD TEA | 1.05 ± .11 | .25 = .02 |
| MD Peak Load | 15.8 ± 1.25 | 12 = 3 |
| MD Elong | 46 = 2 | 16 = 1 |
| CD TEA | .89 ± .22 | .26 = .06 |
| CD Peak Load | 13.2 ± 1.9 | 3.7 = .6 |
| CD Elong | 50 = 7 | 143 = 10 |

|  | Elastomer 1 | Composite 1 |
|---|---|---|
| MD TEA | 1.22 ± .13 | .13 = .03 |
| MD Peak Load | 1.36 = .09 | 2.8 = .24 |
| MD Elong | 581 = 40 | 30 ± 3 |
| CD TEA | .84 ± .2 | .32 = .04 |
| CD Peak Load | .93 = .12 | 1.66 = .22 |
| CD Elong | 574 = 95 | 204 = 11 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 2

| CYCLE: | 1 | 2 | 3 | 4 | To Break |
|---|---|---|---|---|---|

Control 1, Cycled in the cross-machine direction at 38% CD elongation

| | 1 | 2 | 3 | 4 | To Break |
|---|---|---|---|---|---|
| Peak TEA | .932 ± .02 | .28 ± .01 | .24 ± .005 | .21 ± .01 | .50 ± .26 |
| Peak Load | 13.8 ± .2 | 11.8 ± .3 | 11.0 ± .1 | 10.4 ± .3 | 13.8 ± 1.7 |
| Perm. Set | 45. ± 3 | 49 ± 2 | 53 ± 1 | 55 ± 1 | 45 ± 4 |

Heat Set, Cycled in the cross-machine direction at 80% CD elongation

| | 1 | 2 | 3 | 4 | To Break |
|---|---|---|---|---|---|
| Peak TEA | .014 ± .001 | .004 ± .001 | .002 ± .001 | .002 ± .001 | .37 ± .12 |
| Peak Load | .21 ± .01 | .19 ± .01 | .18 ± .01 | .18 ± .01 | 4.06 ± .65 |
| Perm. Set | 22 ± 1 | 25 ± 1 | 28 ± 1 | 37 ± 3 | 143 ± 7 |

Composite 1, Cycled in the cross-machine direction at 109% CD elongation

| | 1 | 2 | 3 | 4 | To Break |
|---|---|---|---|---|---|
| Peak TEA | .10 ± .01 | .06 ± .005 | .06 ± .005 | .053 ± .005 | .285 ± .04 |
| Peak Load | .528 ± .08 | .48 ± .06 | .47 ± .05 | .46 ± .06 | 1.69 ± .2 |
| Perm. Set | 9 ± 1 | 10 ± .5 | 11.2 ± 1 | 11.4 ± 3 | 176 ± 12 |

Elastomer 1, Cycled in the cross-machine direction at 109% CD elongation

| | 1 | 2 | 3 | 4 | To 176% |
|---|---|---|---|---|---|
| Peak TEA | .076 ± .001 | .056 ± .001 | .054 ± .001 | .052 ± .001 | .13 ± .01(N=2) |
| Peak Load | .344 ± .004 | .33 ± .004 | .32 ± .003 | .317 ± .004 | .43 ± .01(N=2) |
| Perm. Set | 8 ± 0 | 9 ± 0 | 10 ± 0 | 10.8 ± .4 | |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 3

GRAB TENSILES:

|  | Control 2 | Composite 2 |
|---|---|---|
| MD TEA | .96 ± .24 | .35 ± .05 |
| MD Peak Load | 15.2 ± 2.75 | 4.57 ± .2 |
| MD Elong | 42.5 ± 6 | 50 ± 5 |
| CD TEA | 1.08 ± .38 | .54 ± .15 |
| CD Peak Load | 14.1 ± 2.7 | 2.45 ± .3 |
| CD Elong | 53 ± 8 | 217 ± 23 |

|  | Elastomer 2 |
|---|---|
| MD TEA | 1.12 ± .34 |
| MD Peak Load | 1.54 ± .17 |
| MD Elong | 427 ± 93 |
| CD TEA | .83 ± .03 |
| CD Peak Load | 1.22 ± .05 |
| CD Elong | 407 ± 17 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 4

| CYCLE: | 1 | 2 | 3 | 4 | |
|---|---|---|---|---|---|
| Elastomer 2, Cycled in the cross-machine direction at 129% CD elongation | | | | | To 235% |
| Peak TEA | .17 ± .006 | .11 ± .004 | .10 ± .004 | .10 ± .004 | .33 ± .03 |
| Peak Load | .60 ± .02 | .55 ± .02 | .54 ± .02 | .53 ± .02 | .765 ± .06 |
| Perm. Set | 8 ± 0 | 10 ± .5 | 11 ± .5 | 13 ± 2 | |
| Composite 2, Cycled in the cross-machine direction at 122% CD elongation | | | | | To Break |
| Peak TEA | .154 ± .02 | .086 ± .01 | .078 ± .01 | .074 ± .005 | .72 ± .15 |
| Peak Load | .96 ± .26 | .854 ± .21 | .82 ± .21 | .79 ± .20 | 2.74 ± .38 |
| Perm. Set | 9 ± 1 | 11 ± 1 | 13 ± 2 | 14 ± 2 | 218 ± 24 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 5

GRAB TENSILES:

|  | Control 5 | Composite 3A |
|---|---|---|
| MD TEA | .96 = .24 | .34 = .06 |
| MD Peak Load | 15.2 = 2.75 | 4.7 = .6 |
| MD Elong | 42.5 = 6 | 55 = 4 |
| CD TEA | 1.08 = 0.38 | .48 = .08 |
| CD Peak Load | 14.1 = 2.7 | 4.3 = .4 |
| CD Elong | 53 = 8 | 97 = 8 |

|  | Elastomer 2 |
|---|---|
| MD TEA | 1.12 = .34 |
| MD Peak Load | 1.54 = .17 |
| MD Elong | 427 = 93 |
| CD TEA | .83 = .03 |
| CD Peak Load | 1.22 = .05 |
| CD Elong | 407 = 17 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 6

| CYCLE: | 1 | 2 | 3 | 4 | To 90% |
|---|---|---|---|---|---|

Elastomer 2, Cycled in the cross-machine direction at 60% CD elongation

| | | | | | To 90% |
|---|---|---|---|---|---|
| Peak TEA | .067 ± .002 | .048 ± .002 | .046 ± .001 | .045 ± .002 | .103 ± .002 |
| Peak Load | .553 ± .01 | .517 ± .012 | .50 ± .01 | .50 ± .01 | .65 ± .01 |
| Perm. Set | 7 ± 0 | 8 ± 0 | 8 ± 0 | 9 ± 1 | |

Composite 3A, Cycled in the cross-machine direction at 55% CD elongation

| | | | | | To Break |
|---|---|---|---|---|---|
| Peak TEA | .19 ± .04 | .082 ± .02 | .07 ± .01 | .065 ± .01 | .484 ± .06 |
| Peak Load | 2.66 ± .35 | 2.37 ± .33 | 2.24 ± .31 | 2.16 ± .28 | 4.08 ± .35 |
| Perm. Set | 18 ± 1 | 20 ± 2 | 22 ± 3 | 24 ± 2 | 91 ± 4 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 7

GRAB TENSILES:

|              | Composite 3B  | Composite 3A |
|--------------|---------------|--------------|
| MD TEA       | .43 ± .07     | .34 ± .06    |
| MD Peak Load | 5.8 ± .51     | 4.7 ± .6     |
| MD Elong     | 52 ± 6        | 55 ± 4       |
| CD TEA       | .41 ± .09     | .48 ± .08    |
| CD Peak Load | 5.25 ± .75    | 4.3 ± .4     |
| CD Elong     | 55 ± 5        | 97 ± 8       |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 8

GRAB TENSILES:

|  | Elastomer 2 | Composite 4 |
|---|---|---|
| MD TEA | 1.12 ± .34 | .33 ± .06 |
| MD Peak Load | 1.54 ± .17 | 5.8 ± .49 |
| MD Elong | 427 ± 93 | 48 ± 4 |
| CD TEA | .83 ± .03 | .60 ± .09 |
| CD Peak Load | 1.22 ± .05 | 3.1 ± .5 |
| CD Elong | 407 ± 17 | 229 ± 12 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 9

| CYCLE: | 1 | 2 | 3 | 4 | |
|---|---|---|---|---|---|

Elastomer 2, Cycled in the cross-machine direction at 129% CD elongation

| | | | | | To 235% |
|---|---|---|---|---|---|
| Peak TEA | .17 ± .006 | .11 ± .004 | .10 ± .004 | .10 ± .004 | .33 ± .03 |
| Peak Load | .60 ± .02 | .55 ± .02 | .54 ± .02 | .53 ± .02 | .76 ± .06 |
| Perm. Set | 8 ± 0 | 10 ± 1 | 11 ± 1 | 13 ± 2 | |

Composite 4, Cycled in the cross-machine direction at 129% CD elongation

| | | | | | To Break |
|---|---|---|---|---|---|
| Peak TEA | .175 ± .025 | .08 ± .01 | .07 ± .004 | .07 ± .004 | .85 ± .07 |
| Peak Load | .89 ± .2 | .77 ± .2 | .71 ± .16 | .69 ± .14 | 3.60 ± .5 |
| Perm. Set | 13 ± 1 | 15 ± 1 | 15 ± 1 | 18 ± 1 | 235 ± 14 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 10

GRAB TENSILES:

| | Composite 5 | Meltblown Laminate |
|---|---|---|
| MD TEA | .35 ± .05 | .17 ± .04 |
| MD Peak Load | 4.57 ± .21 | 4.3 ± .35 |
| MD Elong | 50 ± 5 | 24 ± 3 |
| CD TEA | .54 ± .15 | .38 ± .03 |
| CD Peak Load | 2.45 ± .31 | 2.4 ± .2 |
| CD Elong | 217 ± 23 | 210 ± 10 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 11

| CYCLE: | 1 | 2 | 3 | 4 | To Break |
|---|---|---|---|---|---|
| Composite 5, Cycled in the cross-machine direction at 122% CD elongation | | | | | |
| Peak TEA | .154 ± .02 | .086 ± .01 | .078 ± .008 | .074 ± .005 | .719 ± .15 |
| Peak Load | .96 ± .26 | .85 ± .21 | .82 ± .21 | .80 ± .20 | 2.74 ± .4 |
| Perm. Set | 9 ± 1 | 11 ± 1 | 13 ± 2 | 14 ± 2 | 218 ± 24 |
| Meltblown Laminate, Cycled in the cross-machine direction at 119% CD elongation | | | | | |
| Peak TEA | .089 ± .01 | .051 ± .005 | .047 ± .004 | .045 ± .004 | .512 ± .064 |
| Peak Load | .429 ± .04 | .379 ± .04 | .36 ± .03 | .35 ± .03 | 2.5 ± .14 |
| Perm. Set | 10 ± 1 | 12 ± 1 | 13 ± 1 | 19 ± 6 | 218 ± 10 |

UNITED STATES PATENT AND TRADEMARK OFFICE
CERTIFICATE OF CORRECTION

PATENT NO. : 5,226,992

DATED : July 13, 1993

INVENTOR(S) : Michael T. Morman

It is certified that error appears in the above-identified patent and that said Letters Patent is hereby corrected as shown below:

TABLE 12

GRAB TENSILES:

|  | Meltblown Laminate | Composite 6 |
|---|---|---|
| MD TEA | .17 ± .04 | .28 ± .08 |
| MD Peak Load | 4.3 ± .35 | 5.7 ± .4 |
| MD Elong | 24 ± 3 | 34 ± 7 |
| CD TEA | .38 ± .03 | .96 ± .13 |
| CD Peak Load | 2.4 ± .2 | 3.9 ± .3 |
| CD Elong | 210 ± 10 | 215 ± 16 |

UNITED STATES PATENT AND TRADEMARK OFFICE
CERTIFICATE OF CORRECTION

PATENT NO. : 5,226,992　　　　　　　　　　　　　　　Page 14 of 16

DATED　　　 : July 13, 1993

INVENTOR(S) : Michael T. Morman

It is certified that error appears in the above-identified patent and that said Letters Patent is hereby corrected as shown below:

TABLE 13

| CYCLE: | 1 | 2 | 3 | 4 | To Break |
|---|---|---|---|---|---|
| Meltblown Laminate 1, Cycled in the cross-machine direction at 119% CD elongation | | | | | |
| Peak TEA | .09 ± .01 | .051 ± .005 | .047 ± .004 | .045 ± .004 | .51 ± .06 |
| Peak Load | .43 ± .04 | .38 ± .03 | .36 ± .03 | .35 ± .03 | 2.50 ± .14 |
| Perm. Set | 10 ± 1 | 12 ± 1 | 13 ± 1 | 19 ± 6 | 219 ± 10 |
| Composite 6, Cycled in the cross-machine direction at 121% CD elongation | | | | | |
| Peak TEA | .436 ± .03 | .214 ± .01 | .20 ± .01 | .19 ± .01 | .93 ± .11 |
| Peak Load | 1.98 ± .3 | 1.80 ± .29 | 1.72 ± .29 | 1.67 ± .28 | 3.84 ± .21 |
| Perm. Set | 10 ± 1 | 11 ± 1 | 12 ± 1 | 13 ± 1 | 196 ± 15 |

UNITED STATES PATENT AND TRADEMARK OFFICE
CERTIFICATE OF CORRECTION

PATENT NO. : 5,226,992
DATED : July 13, 1993
INVENTOR(S) : Michael T. Morman

It is certified that error appears in the above-indentified patent and that said Letters Patent is hereby corrected as shown below:

TABLE 14

GRAB TENSILES:

|  | Control 7A | Control 7B |
|---|---|---|
| MD TEA | .88 = .26 | 1.05 = .2 |
| MD Peak Load | 15.9 = 4 | 14.5 = 2 |
| MD Elong | 37 = 5 | 48 = 7 |
| CD TEA | .90 = .36 | 1.25 = .4 |
| CD Peak Load | 12.7 = 3 | 15.5 = 2.6 |
| CD Elong | 51 = 8 | 55 = 8 |
|  | Composite 7 | Spunbond Normalized Composite 7 |
| MD TEA | .43 = .07 | 1.33 = .22 |
| MD Peak Load | 5.8 = .51 | 18 = 1.58 |
| MD Elong | 52 = 6 | - |
| CD TEA | .41 = .09 | 1.27 = .28 |
| CD Peak Load | 5.25 = .75 | 16.3 = 2.3 |
| CD Elong | 55 = 5 | - |

UNITED STATES PATENT AND TRADEMARK OFFICE
CERTIFICATE OF CORRECTION

PATENT NO. : 5,226,992
DATED : July 13, 1993
INVENTOR(S) : Michael T. Morman

It is certified that error appears in the above-indentified patent and that said Letters Patent is hereby corrected as shown below:

|              | Elastomer 2   |
|--------------|---------------|
| MD TEA       | 1.12 = .34    |
| MD Peak Load | 1.54 = .17    |
| MD Elong     | 427 = 93      |
| CD TEA       | .83 = .03     |
| CD Peak Load | 1.22 = .05    |
| CD Elong     | 407 = 17      |

Signed and Sealed this

Twentieth Day of February, 1996

BRUCE LEHMAN

Attest:

Attesting Officer

Commissioner of Patents and Trademarks